(12) United States Patent
Endo et al.

(10) Patent No.: US 9,467,035 B2
(45) Date of Patent: Oct. 11, 2016

(54) VIBRATION ACTUATOR

(75) Inventors: Masaya Endo, Tokyo (JP); Yoshihide Tonogai, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 422 days.

(21) Appl. No.: 14/008,504

(22) PCT Filed: Jun. 27, 2011

(86) PCT No.: PCT/JP2011/064668
§ 371 (c)(1),
(2), (4) Date: Dec. 9, 2013

(87) PCT Pub. No.: WO2012/132028
PCT Pub. Date: Oct. 4, 2012

(65) Prior Publication Data
US 2014/0084710 A1    Mar. 27, 2014

(30) Foreign Application Priority Data
Mar. 31, 2011 (JP) ................. 2011-079441

(51) Int. Cl.
*H02K 33/16* (2006.01)
*H02K 33/04* (2006.01)
*H02K 35/02* (2006.01)
*B06B 1/04* (2006.01)

(52) U.S. Cl.
CPC ............ *H02K 35/02* (2013.01); *B06B 1/045* (2013.01); *H02K 33/16* (2013.01)

(58) Field of Classification Search
CPC ...... H02K 33/00; H02K 33/02; H02K 33/04; H02K 33/06; H02K 33/12; H02K 33/14; H02K 33/16; H02K 35/02; H02K 41/03; B26B 19/00; B26B 19/28; B06B 1/02; B06B 1/04; F16F 7/104
See application file for complete search history.

(56) References Cited

U.S. PATENT DOCUMENTS 3,103,603 A     9/1963   Jean
6,833,639 B2 *  12/2004  Lau ................... A61C 17/3418
                                                         310/17

(Continued)

FOREIGN PATENT DOCUMENTS

JP      5-60158 U    8/1993
JP      8-196053     7/1996

(Continued)

OTHER PUBLICATIONS

Search Report dated Sep. 20, 2011 from International Application No. PCT/JP2011/064668.

(Continued)

*Primary Examiner* — Tran Nguyen
(74) *Attorney, Agent, or Firm* — Troutman Sanders LLP

(57) ABSTRACT

A cylindrical magnet of an oscillating actuator includes a plurality of divided magnet portions which are magnetized in the radial direction. Since adjacent magnet portions have different poles in the direction of an oscillation axis, magnetic poles do not repel each other when adhering the magnet portions and it is thus easy to adhere the magnet portions to each other. In addition to this construction of the magnet, a coil includes a plurality of divided coil portions corresponding to the magnet portions in the direction of the oscillation axis, and adjacent coil portions are wound in opposite directions to each other.

2 Claims, 9 Drawing Sheets

(56) References Cited

U.S. PATENT DOCUMENTS

| | | | |
|---|---|---|---|
| 6,873,067 B2 | 3/2005 | Ichii et al. | |
| 6,984,913 B2 | 1/2006 | Neuenschwander | |
| 7,023,112 B2* | 4/2006 | Miyamoto | H02K 33/16 310/12.31 |
| 7,420,287 B2* | 9/2008 | Smushkovich | F03B 13/1845 290/42 |
| 7,614,856 B2* | 11/2009 | Inagaki | F04B 35/045 267/136 |
| 2002/0195884 A1* | 12/2002 | Ichii | A61C 17/34 310/15 |
| 2003/0142845 A1* | 7/2003 | Miyamoto | H02K 33/16 381/396 |
| 2004/0104625 A1* | 6/2004 | Wakuda | B06B 1/0215 310/15 |
| 2006/0158048 A1* | 7/2006 | Kobayashi | A61C 17/3445 310/12.04 |
| 2007/0040457 A1 | 2/2007 | Shimizu et al. | |
| 2010/0027092 A1 | 2/2010 | Van Os | |

FOREIGN PATENT DOCUMENTS

| | | |
|---|---|---|
| JP | 11-341778 | 12/1999 |
| JP | 2003-117488 | 4/2003 |
| JP | 2003-117489 | 4/2003 |
| JP | 2003-220363 | 8/2003 |
| JP | 2004-73983 | 3/2004 |
| JP | 2004-343931 | 12/2004 |
| JP | 2006-280033 | 10/2006 |
| JP | 2006-296161 | 10/2006 |

OTHER PUBLICATIONS

Search Report dated Sep. 13, 2011 from International Application No. PCT/JP2011/064697.
Preliminary Report on Patentability dated Feb. 21, 2013 from International Application No. PCT/JP2011/064697.
Preliminary Report on Patentability dated Oct. 10, 2013 from International Application No. PCT/JP2011/064668.

* cited by examiner

VIBRATION ACTUATOR

TECHNICAL FIELD

An aspect of the present invention relates to a small sized oscillating actuator which is used as a vibration generating source for informing a user of a call, of a portable wireless device such as a portable phone, or a vibration generating source for transferring an operation sense of a touch panel or a realistic sense of a game machine to fingers or hands.

BACKGROUND ART

Japanese Laid-Open Patent Publication No. 2003-117488 discloses a technology belonging to such a field. An oscillating actuator disclosed in Japanese Laid-Open Patent Publication No. 2003-117488 is made of a magnetic material and has a cylindrical frame. A pair of brackets is fitted in an axial outer end of the cylindrical frame. A fixed shaft is fixed to each bracket so as to movably support a mover in an axial direction. A cylindrical coil formed by a wire wound in an identical direction on a circumference is fixed on an inner peripheral surface of the frame. The mover includes a cylindrical magnet, which is disposed within a gap of the coil and magnetized along a radial direction, and a pair of bearings, which is arranged on axial opposite ends of the magnet and is made of sintered alloys with which a lubricant is impregnated. A pair of coil springs is disposed between the mover and the pair of brackets.

Further, an oscillator having a high performance can be achieved by fully magnetizing a cylindrical magnet by using a magnet having a large energy product, for example, an NdFeB-based sintered magnet. However, in a small-sized oscillator, a single pole magnetization in a radial direction is very difficult to achieve because of self-saturation of the magnetizer. Therefore, the cylindrical magnet is obtained by dividing a cylindrical magnetic body into two or three magnetic pieces in the circumferential direction, magnetizing each of the magnetic pieces in the thickness direction, and then reconstructing the divided magnetic pieces (magnet parts) with an adhesive agent. According to this method, since each of the divided magnetic pieces is independently fully magnetized, the reconstructed cylindrical magnet has an improved performance. Especially, use of an anisotropic magnet in the thickness direction is further effective and can achieve an oscillating actuator having a high performance.

CITATION LIST

Patent Literatures

Patent Literature 1: Japanese Patent Laid-Open Publication No. 2003-117488

SUMMARY OF INVENTION

Technical Problem

However, when a plurality of magnetic pieces divided in the circumferential direction are adhered by an adhesive agent so as to make a cylindrical magnet, adjacent magnetic pieces (magnetic parts) have the same polarities which thus repel one another. Therefore, it is difficult to adhere the divided magnetic pieces to one another, and even worse, the divided magnetic pieces may be misaligned when they are adhered to one another.

An aspect of the present invention is to provide an oscillating actuator, which can achieve a secure and easy single pole magnetization of a magnet in a radial direction and can easily promote the size-reduction of the oscillating actuator which allows a housing with a small diameter.

Solution to Problem

According to an aspect of the present invention, there is provided an oscillating actuator in which a magnet linearly oscillates along an oscillation axis of a housing having a cylindrical shape by cooperation between a coil disposed in the housing and the magnet disposed in the housing while being surrounded by the coil. The oscillating actuator includes: a shaft which is disposed along the oscillation axis of the housing and has opposite ends fixed to opposite end walls of the housing in a direction of the oscillation axis, respectively; a mover having the magnet which is freely movable in an extending direction of the shaft, the shaft extending through the magnet; and an elastic member disposed between the mover and the end wall, the elastic member urging the mover in the direction of the oscillation axis, wherein the shaft and the housing are formed of a magnetic material, the magnet having a cylindrical shape includes a plurality of magnet portions which are magnetized in a radial direction and are divided in the direction of the oscillation, axis, the magnet portions include adjacent magnet portions having different magnetic poles in the direction of the oscillation axis, and the coil includes a plurality of coil portions which are divided in the direction of the oscillation axis and correspond to the magnet portions, respectively, and the coil portions include adjacent coil portions wound in opposite directions to each other.

In the fascinating actuator, the shaft made of a magnetic material extends through the magnet. Opposite ends of the shaft are fixed to opposite end walls of the housing made of a magnetic material in the direction of the oscillation axis, and the magnet oscillates while being guided along the shaft. Use of the fixed shaft can prevent the center of gravity of the weight from deviating from the oscillation axis, thereby securing a stable oscillation. Moreover, even when a drop impact occurs, the magnet is prevented from colliding with the coil, resulting in the improvement of durability against the drop impact. Also, since the cylindrical magnet includes a plurality of magnet portions, which are magnetized in the radial direction and are divided in the direction of the oscillation axis, and the adjacent magnet portions have different poles in the direction of the oscillation axis, magnetic poles do not repel each other when the magnets portions are bonded to each other, which makes it easy to bond the magnet portions to each other. In addition, the magnet portions do not easily deviate from each other. Further, the number of bonded magnet portions may be easily increased. Accordingly, the power of the oscillating actuator can be easily increased by increasing the length of the magnet in the direction of the oscillation axis, without the necessity to increase the diameter of the magnet. According to the construction of the magnet as described above, the coil includes a plurality of divided coil portions corresponding to the magnet portions, respectively, and the adjacent coil portions are wound in opposite directions to each other. The oscillating actuator having the above structure can easily promote the size reduction of the housing by reducing the diameter of the housing.

Further, the mover may have a weight which is integrated with the magnet and may be freely movable, the shaft may extend through the weight, the weight may be disposed adjacent to the magnet in the housing in the extending direction of the shaft, the elastic member may be disposed between the weight and the end wall, the weight may have a spring seating recess formed along the oscillation axis at an end of the weight, the weight may be supported by a bearing disposed in the spring seating recess with respect to the shaft, and the bearing and the weight may be urged by the elastic member inserted in the spring seating recess.

By employing the bearings, it is possible to achieve a stable oscillation without contact between the weights and the shaft, which can reduce the noise. In addition, since the hearings are disposed in the spring seating recesses, the bearings can be placed near the center of gravity of the weights, resulting in a decrease of the noise. Furthermore, as the elastic member is inserted in the spring seating recess, it is possible to elongate the entire length of the elastic member in the direction of the oscillation axis. Therefore, the elastic member can provide a stable elasticity, and the bearings do not easily depart from the weights even without using an adhesive agent.

Advantageous Effects of Invention

According to an aspect of the present invention, it is possible to achieve a secure and easy single pole magnetization of a magnet in a radial direction and to easily promote the size reduction of the oscillating actuator by reducing the diameter of the housing.

DESCRIPTION OF EMBODIMENTS

Figure 1:
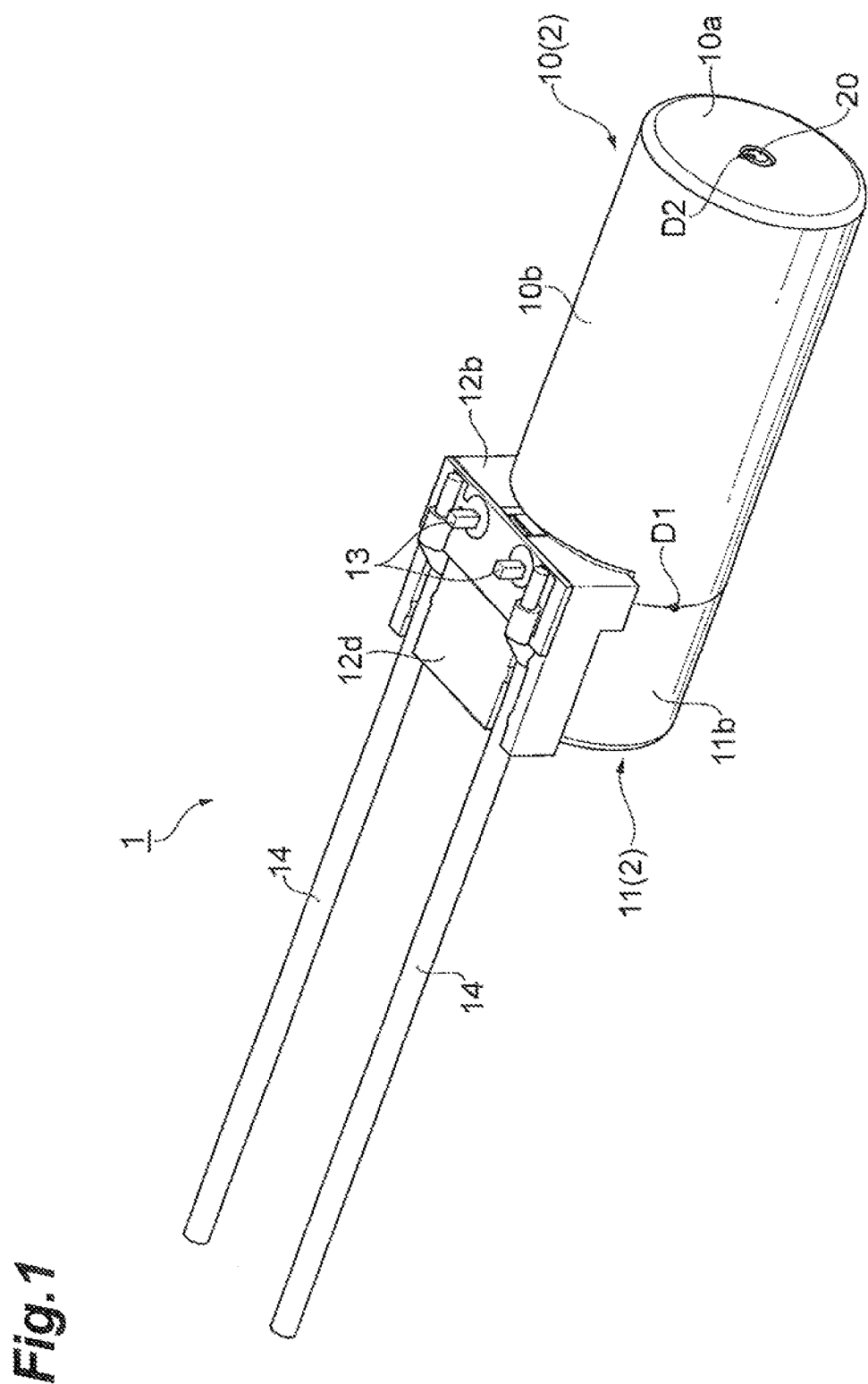
FIG. 1 is a perspective view illustrating an oscillating actuator according to a first embodiment of the present invention.

Hereinafter, oscillating actuators according to preferred embodiments of the present invention will be described with reference to the accompanying drawings. Further, with various oscillating actuators, identical reference numerals are used to denote identical or equivalent elements and repetitive description will be omitted.

Figure 2:
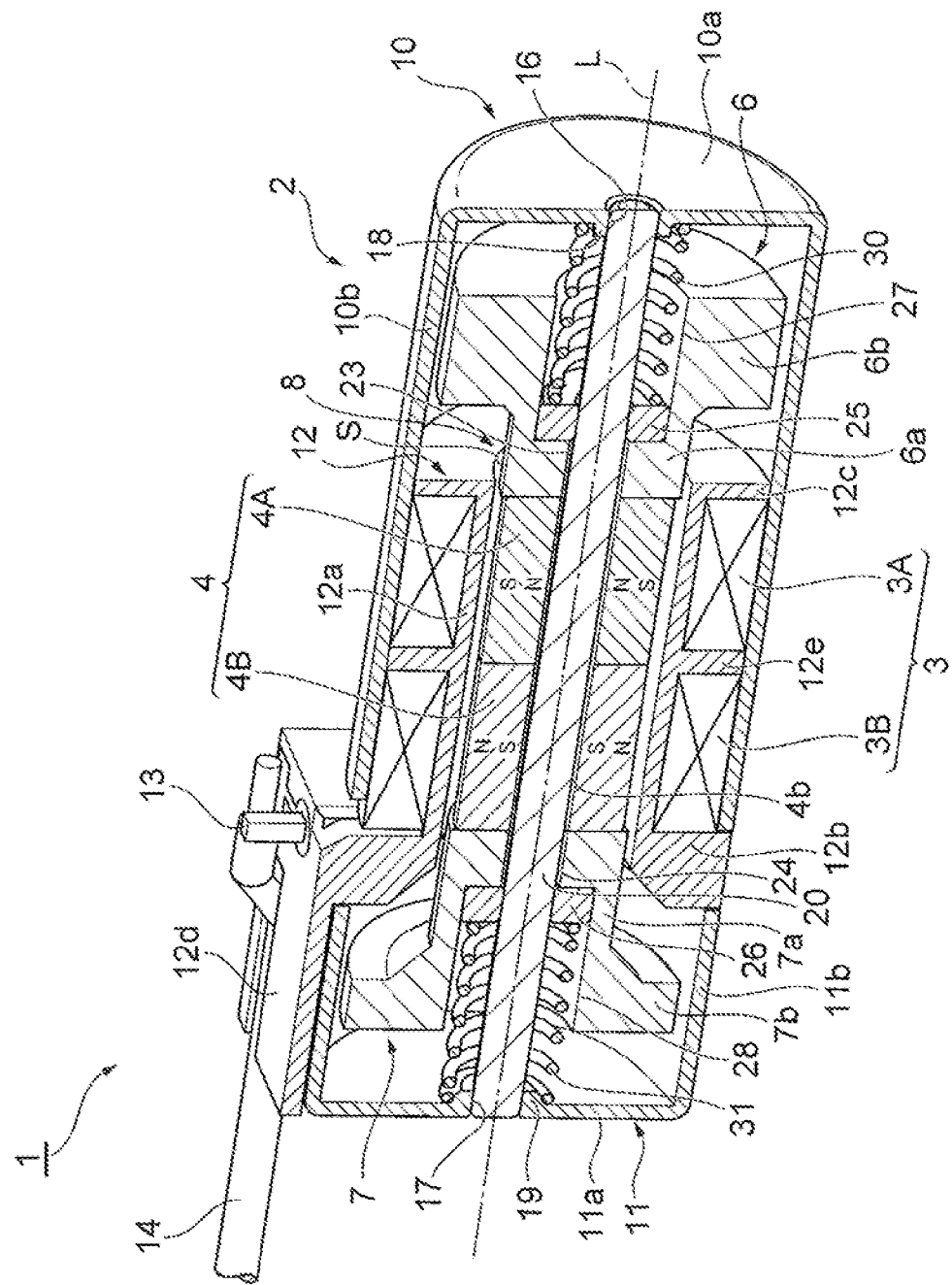
FIG. 2 is a sectional view illustrating the oscillating actuator shown in FIG. 1.

As shown in FIGS. 1 and 2, an oscillating actuator 1 has a cylindrical housing 2 with a diameter of about 4.5 mm. The housing 2 made of a magnetic material receives a coil 3 annularly wound around an oscillation axis L of the housing 2, a cylindrical magnet 4 surrounded by the coil 3, and first and second weights 6 and 7 disposed adjacent to both sides of the magnet 4 in the direction of the oscillation axis L of the housing 2. In the oscillating actuator 1, the magnet 4 and the first and second weights 6 and 7 which constitute a mover 8 are integrally assembled so that the mover 8 linearly oscillates along the direction of the oscillation axis L of the housing 2 by the cooperation between the coil 3 and the magnet 4.

The housing 2 is divided into two parts including a first housing 10 and a second housing 11 in the direction dividing the oscillation axis L. More specifically, in the divided housing 2, the first housing 10 includes a disk shaped end wall 10a located at one end of the housing 2 in the direction of the oscillation axis L, and a surrounding wall 10b which extends in the direction of the oscillation axis L from this end wall 10a and has a cylindrical shape. The first housing 10 receives the first weight 6, the coil 3, and the magnet 4.

The second housing 11 is disposed opposite to the first housing 10 in the direction of the oscillation axis L. The second housing 11 includes an end wall 11a which is located at the other end of the housing 2 in the direction of the oscillation axis L and has a disk shape, and a surrounding wall 11b which extends along the oscillation axis L from the end wall 11a and has a cylindrical shape. The second housing 11 receives the second weight 7. The first and second housings 10 and 11 are formed of a magnetic body such as SPCC (cold rolled steel sheet). Also, a terminal stand 12d constituting a part of a bobbin 12 made of resin is exposed between the first housing 10 and the second housing 11.

The bobbin 12 includes a cylindrical portion 12a, which has a smaller diameter than that of the surrounding walls 10b and 11b of the first and second housings 10 and 11 and is inserted in the surrounding wall 10b to allow the coil 3 to be wound on the cylindrical portion 12a, flange portions 12b and 12c formed at opposite ends of the cylindrical portion 12a in the direction of the oscillation axis L, an annular partition portion 12e formed between the flange portions 12b and 12c, and the terminal stand 12d extending along the surrounding wall 11b from an outer end of the thick flange portion 12b.

The first coil portion 3A is disposed between the flange portion 12c and the partition portion 12e. The second coil portion 3B is disposed between the flange portion 12b and the partition portion 12e. In addition, the first coil portion 3A and the second coil portion 3B, which are adjacent to each other, are wound in opposite directions. Through the first coil portion 3A and the second coil 3B, the electric current flows in opposite circumferential directions.

Further, the cylindrical shape portion 12a on which the coil 3 is wound is located substantially at a center of the housing 2 in the direction of the oscillation axis L. The flange portion 12c at one side is in contact with an inner peripheral surface of the surrounding wall 10b of the first housing 10. The flange portion 12b at the other side is exposed between the surrounding wall 10b and the surrounding wall 11b. A terminal 13 soldered to a lead wire 14 is fixed to the terminal stand 12d which extends along a surface of the surrounding wall 11b from an end portion of the flange portion 12b.

Open ends of the surrounding walls 10b and 11b of the first and second housings 10 and 11 are in contact with each other except for at the position where the flange portion 12b of the bobbin 12 is exposed, and are bonded to each other through welding at several welding portions D1 (see FIG. 1).

Both end walls 10a and 11a have shaft holding holes 6 and 17 formed through center portions thereof, respectively. Annular protrusions 18 and 19 are formed around the shaft holding holes 16 and 17 by a burring process and protrude from the end walls 10a and 11a toward the inside of the housing 2. Both ends of a shaft 20 made of a magnetic material with a diameter of about 0.6 mm are press-fitted in the shaft holding holes 116 and 17, respectively. Furthermore, both ends of the shaft 20 are fixed to both end walls 10a and 11a by means of a welding portion D2 (see FIG. 1), respectively. As a result, the shaft 20 is disposed along the oscillation axis L of the housing 2 while firmly connecting the first housing 10 and the second housing 11 with each other in the direction of the oscillation axis L. Also, the shaft 20 extends through the above-mentioned mover 8.

In the single pole magnetization in a diameter direction, for a small-sized magnetic body for making a cylindrical magnet, an easier and more reliable magnetization can be achieved by dividing a magnetic body into magnetic body segments in the direction of the oscillation axis L and then magnetizing the magnetic body segments by a magnetizing device, than by magnetizing one cylindrical magnetic body.

Accordingly, the cylindrical magnet 4 includes a first magnet portion 4A and a second magnet portion 4B, which are magnetized in the radial direction and are divided in the direction of the oscillation axis L. The first magnet portion 4A is opposite to the first coil portion 3A and the second magnet portion 4B is opposite to the second coil portion 3B. Further, the first magnet portion 4A and the second magnet portion 4B adjacent to each other have different poles in the direction of the oscillation axis L. Specifically, the first magnet portion 4A has an outer peripheral side magnetized as an S pole and an inner peripheral side magnetized as an N pole, and the second magnetic portion 4B has an outer peripheral side magnetized as an N pole and an inner peripheral side magnetized as an S pole.

As described above, since the adjacent magnet portions 4A and 4B have different polarities in the direction of the oscillation axis L, the magnetic poles do not repel when they are bonded to each other, resulting in easy joining of the magnet portions 4A and 4B to each other. In addition, the magnet portions 4A and 4B are not easily misaligned from each other. Furthermore, it is possible to easily increase the number of magnet portions 4A and 4B which are bonded to each other. As a result, the magnet 4 can have an increased length in the direction of the oscillation axis without an increase in the diameter of the magnet 4 for the purpose of increasing the power of the magnet 4. The oscillating actuator 1 having the above-mentioned structure can easily achieve the size reduction of the oscillating actuator 1 by reducing the diameter of the housing 2. Moreover, the adjacent magnet portions 4A and 4B can be bonded to each other with or without an adhesive agent.

The first magnet portion 4A has a shaft thru-hole 4a, which is formed through the first magnet portion 4A and has a diameter slightly larger than an outer diameter of the shaft 20. The second magnet 4B has a shaft thru-hole 4b, which is formed through the second magnet 4B and has a diameter slightly larger than the outer diameter of the shaft 20. Moreover, the first and second magnet portions 4A and 4B are disposed in the cylindrical portion 12a of the bobbin 12, and constitute a magnetic circuit, in cooperation with the coil 3, the magnet 4, the first housing 10 made of a magnetic material, and the shaft 20 made of a magnetic material.

The first and second weights 6 and 7 include body portions 6a and 7a which can be inserted into a hollow portion S of the cylindrical portion 12a of the bobbin 12, and flange portions 6b and 7b which have a larger diameter and are formed at the ends of the body portions 6a and 7a, respectively. The first and second weights 6 and 7 have shaft thru-holes 23 and 24, which are formed through the first and second weights 6 and 7 and have a diameter larger than the outer diameter of the shaft 20, respectively. First and second bearings (sintered oil impregnated bearing) 25 and 26, though which the shaft 20 extends, are disposed in the shaft thru-holes 23 and 24, respectively. Further, the first and second weights 6 and 7 have first and second spring seating recesses 27 and 28, which have a cylindrical shape, extend from the shaft thru-holes 23 and 24 to end surfaces of the weights, and have a larger diameter that that of the shaft thru-holes 23 and 24, respectively.

A first bearing 25 is inserted in the first spring seating recess 27 to support the first weight 6 with respect to the shaft 20. A first compression coil spring 30 inserted in the first spring seating recess 27 is disposed between the first bearing 25 and the end wall 10a. The first bearing 25 and the first weight 6 are urged by the first compression coil spring 30. Also, the shaft 20 extends through the first compression coil spring 30.

A second bearing 26 is inserted in the second spring seating recess 28 to support the second weight 7 with respect to the shaft 20. A second compression coil spring 31 inserted in the second spring seating recess 28 is disposed between the second bearing 26 and the end wall 11a. The second bearing 26 and the second weight 7 are urged by the second compression coil spring 31. Also, the shaft 20 extends through the second compression coil spring 31.

By employing the bearings 25 and 26, it is possible to achieve a stable oscillation without contact between the weights 6 and 7 and the shaft 20, which can reduce the noise. In addition, since the bearings are disposed in the spring seating recesses 27 and 28, the bearings 25 and 26 can be placed near the center of gravity of the weights 6 and 7, resulting in a decrease of the noise. Moreover, since the compression coil springs 30 and 31 are inserted in the spring seating recesses 27 and 28, it is possible to elongate the entire length of the compression coil springs 30 and 31 in the direction of the oscillation axis L. Therefore, the compression coil springs can provide a stable elasticity, and the bearings 25 and 26 do not easily depart from the weights 6 and 7 even without using an adhesive agent.

Here, identical parts are used as the first compression coil spring 30 and the second compression coil spring 31. The protrusions 18 and 19 formed on both end walls 10a and 11a are fitted in one-side ends of the first and second compression coil springs 30 and 31, respectively. As a result, the first and second compression coil springs 30 and 31 are not in contact with the shaft 20. The other-side ends of the first and second compression coil springs 30 and 31 are inserted in the spring seating recesses 27 and 28 while being in contact with the bearings 25 and 26 within the spring seating recesses 27 and 28, respectively. The bearings 25 and 26 are pressed against first and second weights 6 and 7 by the urging force of the compression coil springs 30 and 31, respectively.

By the construction described above, the first and second weights 6 and 7 and the magnet 4 are coaxially arranged, are urged in the direction of the oscillation axis L by the first and second compression coil springs 30 and 31, and are pressed and integrated with each other by this urging force. Accordingly, the first and second weights 6 and 7, and the first and second magnet portions 4A and 4B can be coupled to each other even without use of an adhesive agent. When there is leakage of an adhesive agent, the shaft 20 may slide on the adhesive agent to cause a friction resistance. However, the oscillating actuator 1 can prevent this situation. Further, the first and second weights 6 and 7, and the first and second magnet portions 4A and 4B may be coupled to each other by using an adhesive agent.

In the oscillating actuator 1, the shaft 20 having both ends fixed to the end walls 10a and 11a of the housing 2, respectively, extends through the magnet 4 and the weights 6 and 7. Since the magnet 4 and the weights 6 and 7 integrally oscillate while being guided by the fixed shaft 20, the center of gravity of the weights 6 and 7 is prevented from violently moving beyond alignment with the oscillation axis L, so that it is possible to secure a stable oscillation. Moreover, even when a drop impact occurs, the weights 6 and 7 are prevented from colliding with the housing 2, resulting in the improvement of durability against the drop impact.

Also, because the housing 2 has been divided into two parts in the direction of dividing the oscillation axis L, the shaft 20 functions as a connection bar when both ends of the shaft 20 are fixed to both end walls 10a and 11a of the housing 2, respectively. As a result, the connection strength between the first housing 10 and the second housing 11 is improved. Accordingly, when a drop impact is applied, the housing 2 is divided in the direction of the oscillation axis L, so as to prevent the weights 6 and 7 or the magnet 4 from jumping out from housing 2.

Furthermore, since the first weight 6 and the second weight 7 are disposed on either side of the magnet 4 in the direction of the oscillation axis L, respectively, it is possible to secure a more stable oscillation. Moreover, since the first and second weights 6 and 7 move along the shaft 20 via the bearings 25 and 26 inserted between the weights and the shah, it is possible to achieve an oscillation having a good balance along the shaft 20.

Figure 3:
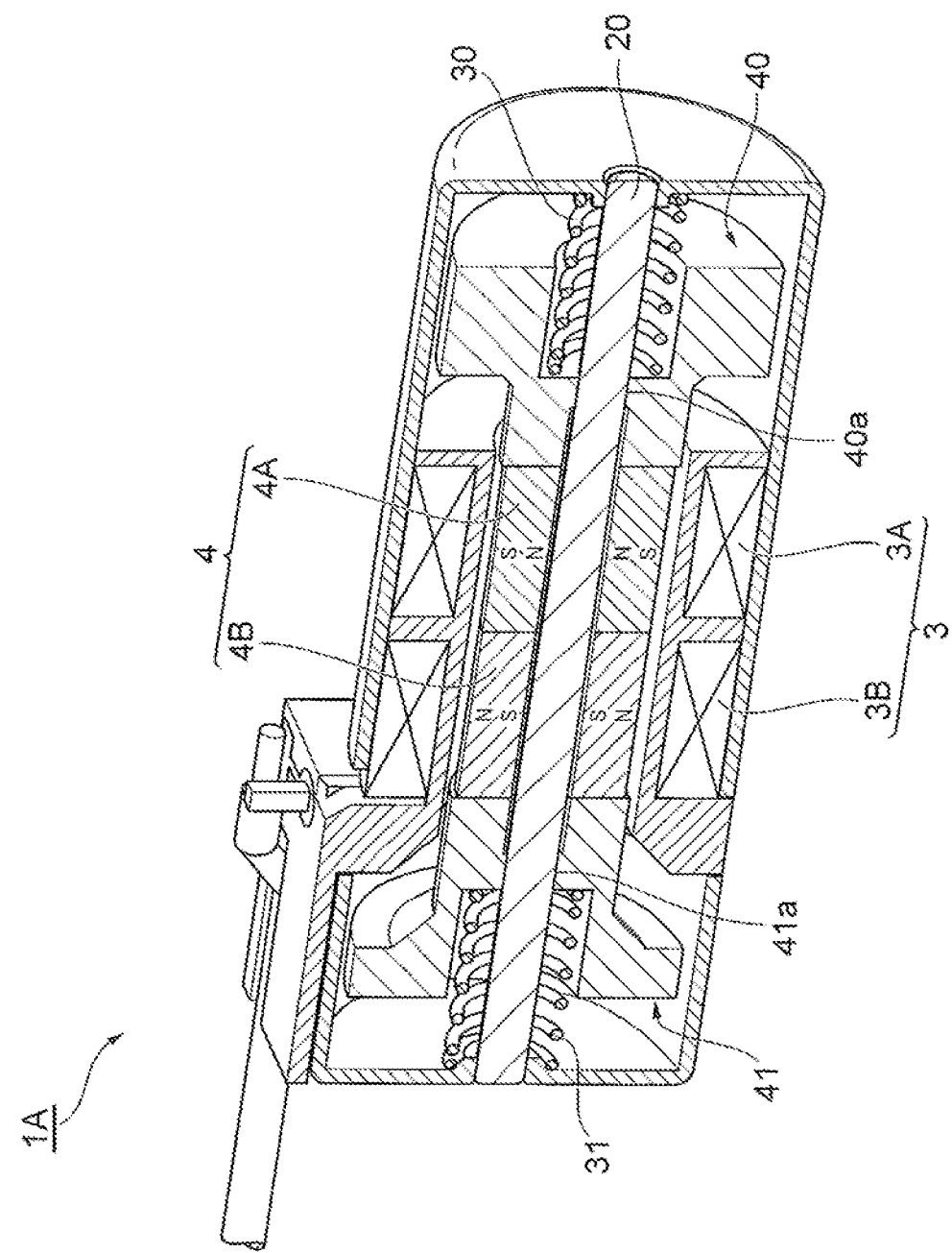
FIG. 3 is a sectional view illustrating an oscillating actuator according to a second embodiment of the present invention.

In the oscillating actuator 1, when the weights 6 and 7 are molded from tungsten or the like, the weights 6 and 7 have rough surfaces. Therefore, the friction resistance may increase or the diameter size of the thru-holes formed through the weights 6 and 7 may be required to be strictly managed, which makes it preferable to use separate hearings. However, as shown in FIG. 3, in an oscillating actuator 1A according to a modified embodiment of the present invention, weights 40 and 41 are molded from a material having a small friction resistance and thus have bearings 40a and 41a formed by reducing the diameter of middle parts of the shaft thru-holes 23 and 23, respectively.

It goes without saying that the present invention is not limited to the above-mentioned embodiments.

Figure 4:
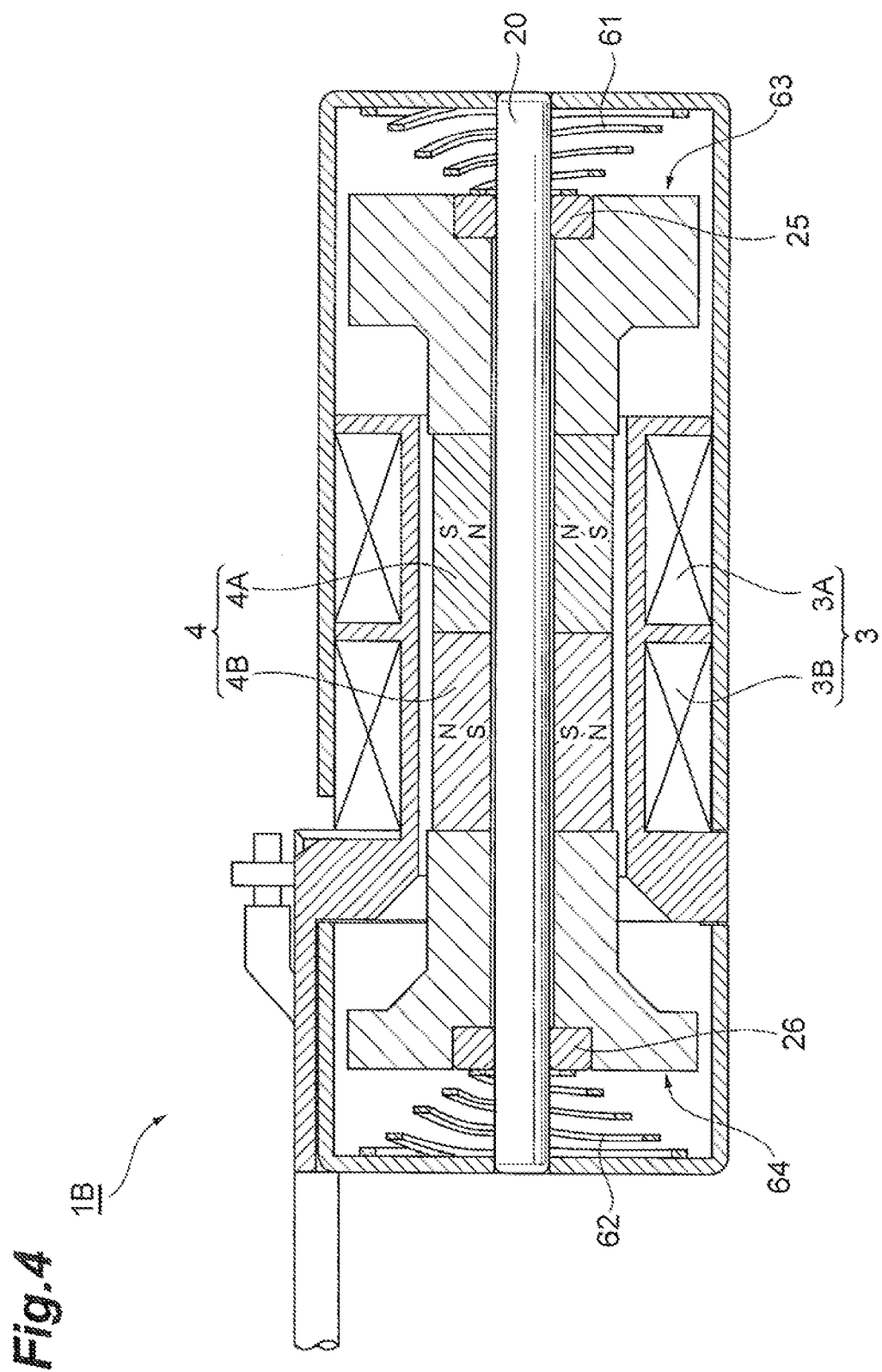
FIG. 4 is a sectional view illustrating an oscillating actuator according to a third embodiment of the present invention.
Figure 5:
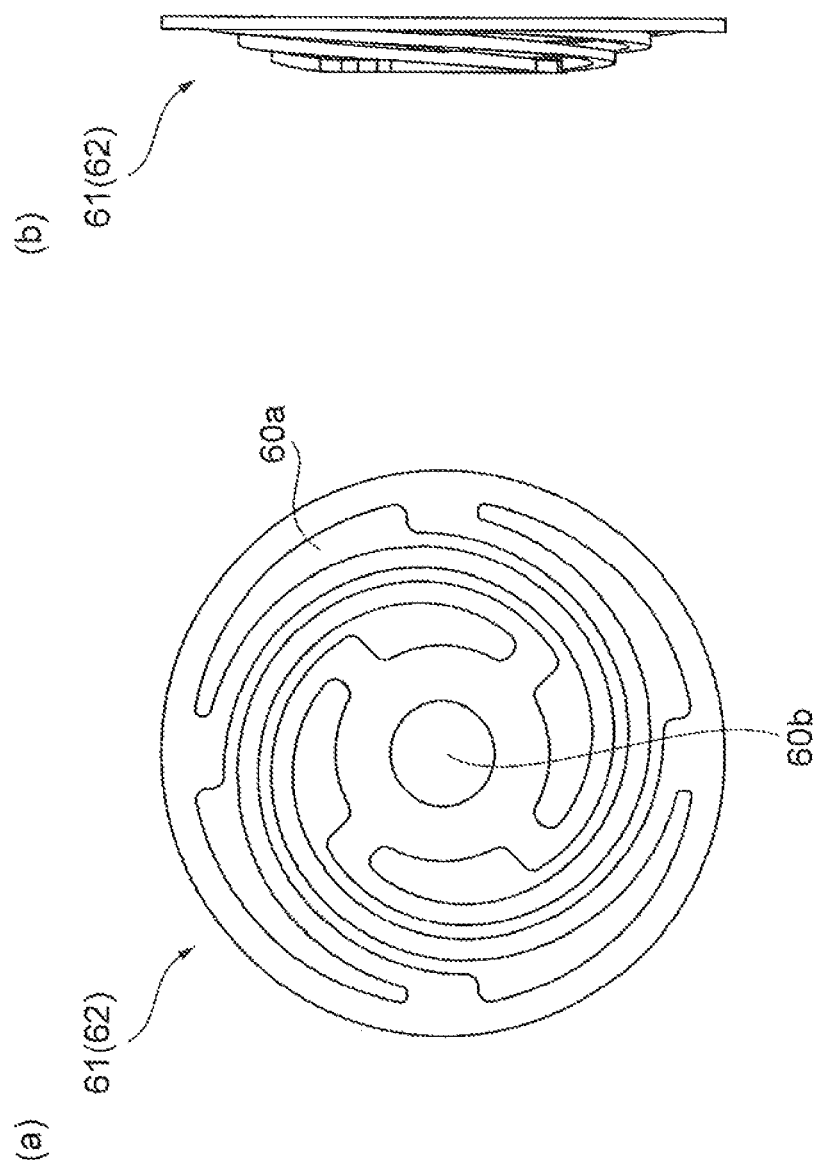
FIG. 5A is a plan view illustrating a leaf spring.
FIG. 5B is a side view illustrating the leaf spring.

It is possible to use a leaf spring as well as the compression coil spring as an elastic member. As shown in FIG. 4, in an oscillating actuator 1B, a first weight 63 and a second weight 64 may be supported by a first leaf spring 61 and a second leaf spring 62. First and second bearings 25 and 26 are disposed at ends of the first and second weights 63 and 64 and are used as spring bearings for the leaf springs 61 and 62, respectively. The first leaf spring 61 and the second leaf spring 62 have an identical shape, and are formed to have a shape of a truncated cone by punching a plurality of arc-shaped slits 60a and a central opening 60b through a disk, as shown in FIGS. 5A and 5B. On the other hand, conical coil springs may be employed as the first and second leaf springs.

Figure 6:
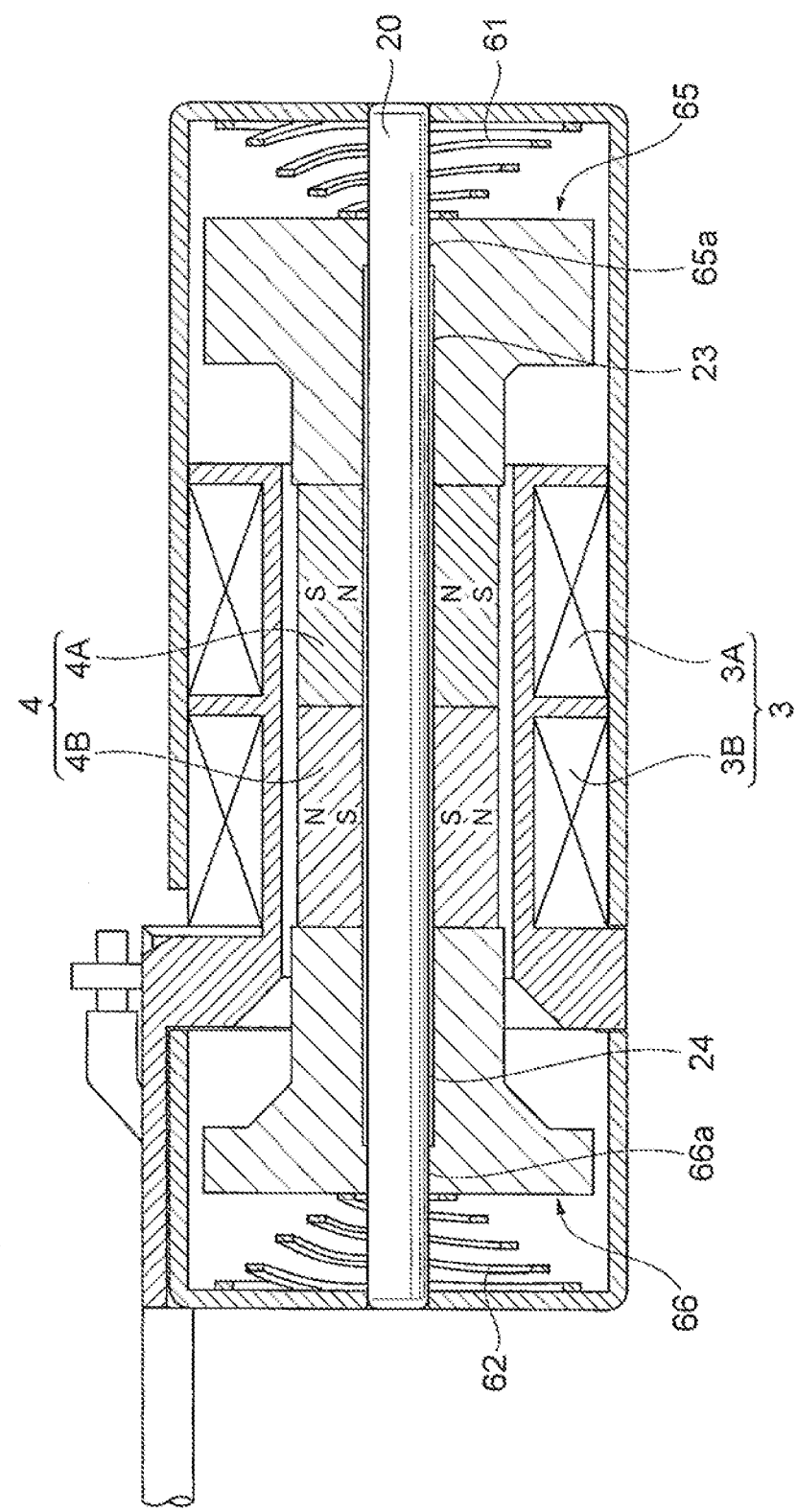
FIG. 6 is a sectional view illustrating an oscillating actuator according to a fourth embodiment of the present invention.

In the oscillating actuator 1B, when the weights 63 and 64 are molded from tungsten or the like, the weights 6 and 7 have rough surfaces. Therefore, the friction resistance may increase or the diameter size of the thru-holes formed through the weights 6 and 7 may be required to be strictly managed, which makes it preferable to use separate bearings. However, as shown in FIG. 6, in an oscillating actuator 1C according to a modified embodiment thereof, weights 65 and 66 are molded from a material having a small friction resistance and thus have hearings 65a and 66a formed by reducing the diameter of middle parts of the shaft thru-holes 23 and 24, respectively.

Figure 7:
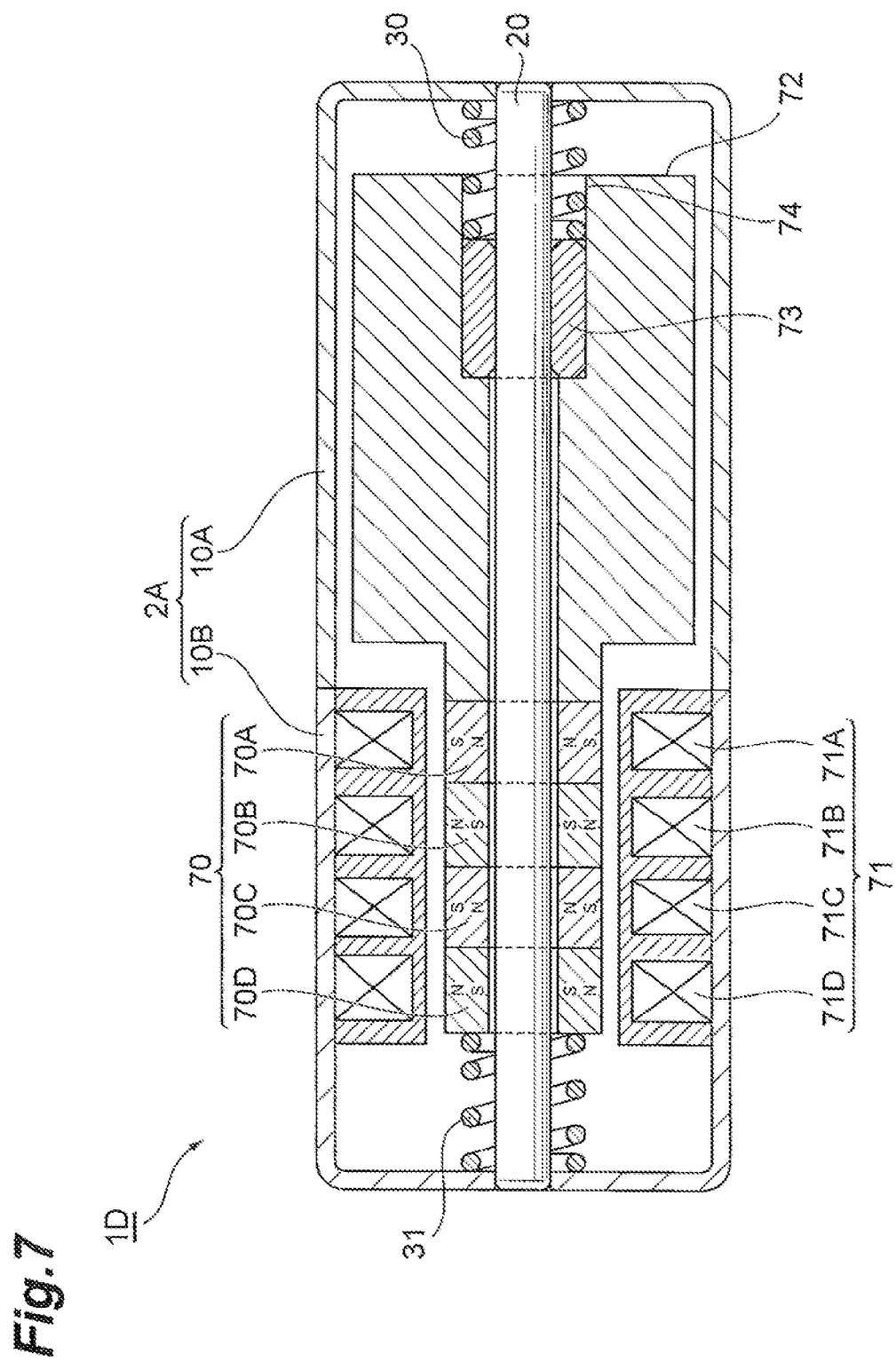
FIG. 7 is a sectional view illustrating an oscillating actuator according to a fifth embodiment of the present invention.

Further, without being limited to the division into two parts, the magnet and the coils may be divided into three or more parts, so that each of the magnet and the coil may be divided into three or more magnet segments or coil segments in the direction of the oscillation axis L. That is, the number of the divided magnet segments is identical to that of the divided coil segments. Each magnet segment is opposite to each coil segment. For example, as shown in FIG. 7, in an oscillating actuator 1D, a housing 2A is equally divided into substantially two parts, i.e. a first housing 10A and a second housing 10B, in the direction of the oscillation axis L. A magnet 70 and a coil 71, each of which has been divided into four portions, are arranged, in the housing 2A. The magnet 70 includes first, second, third, and fourth magnet portions 70A, 70B, 70C and 70D, which are magnetized in the radial direction and have been divided in the direction of the oscillation axis L. Among the magnet portions 70A, 70B, 70C and 70D, adjacent portions have different magnetic poles in the direction of the oscillation axis L. The coil 71 includes first, second, third and fourth divided coil portions 71A, 71B, 71C and 71D which correspond to the first, second, third and fourth magnet portions 70A, 70B, 70C and 70D in the direction of the oscillation axis L, respectively. Among the coil portions 71A, 71B, 71C and 71D, adjacent coil portions are wound in, opposite directions to one another.

Further, a weight 72 is disposed at only one side of the magnet 70. A first compression coil spring 30 urges the weight 72 via a bearing 73 in a spring seating, recess 74. The second compression coil spring 31 directly and urges the magnet 70.

Figure 8:
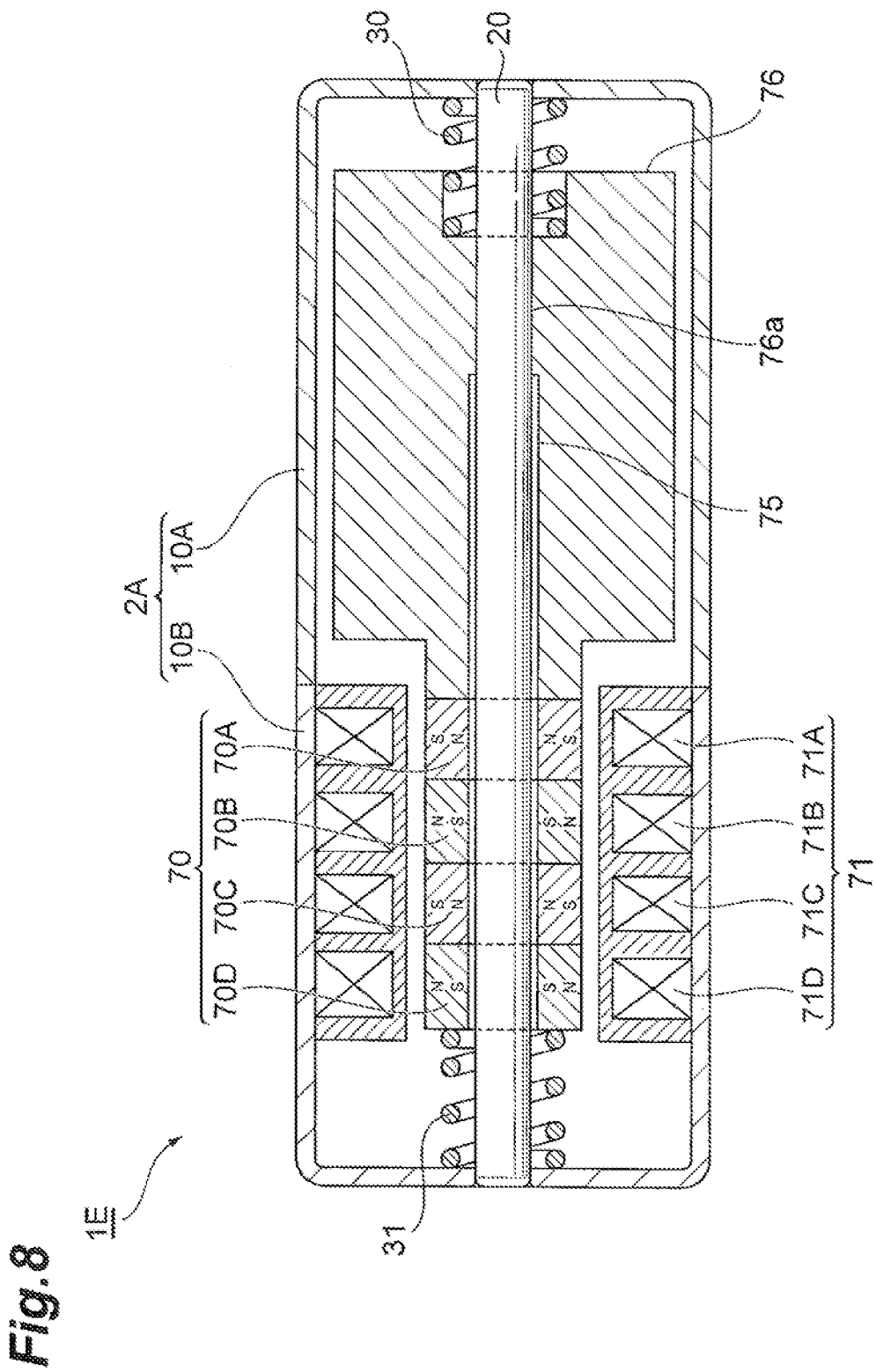
FIG. 8 is a sectional view illustrating an oscillating actuator according to a sixth embodiment of the present invention.

In the oscillating actuator 1D, when the weight 72 is molded from tungsten or the like, the weight 72 has a rough surface. Therefore, the friction resistance may increase or the diameter size of the thru-hole formed through the weight 72 may be required to be strictly managed, which makes it preferable to use a separate bearing. However, as shown in FIG. 8, in an oscillating actuator 1E according to a modified embodiment thereof, a weight 76 is molded from a material having a small friction resistance and thus has a bearings 76a formed by reducing the diameter of a middle part of the shaft thru-hole 75.

Figure 9:
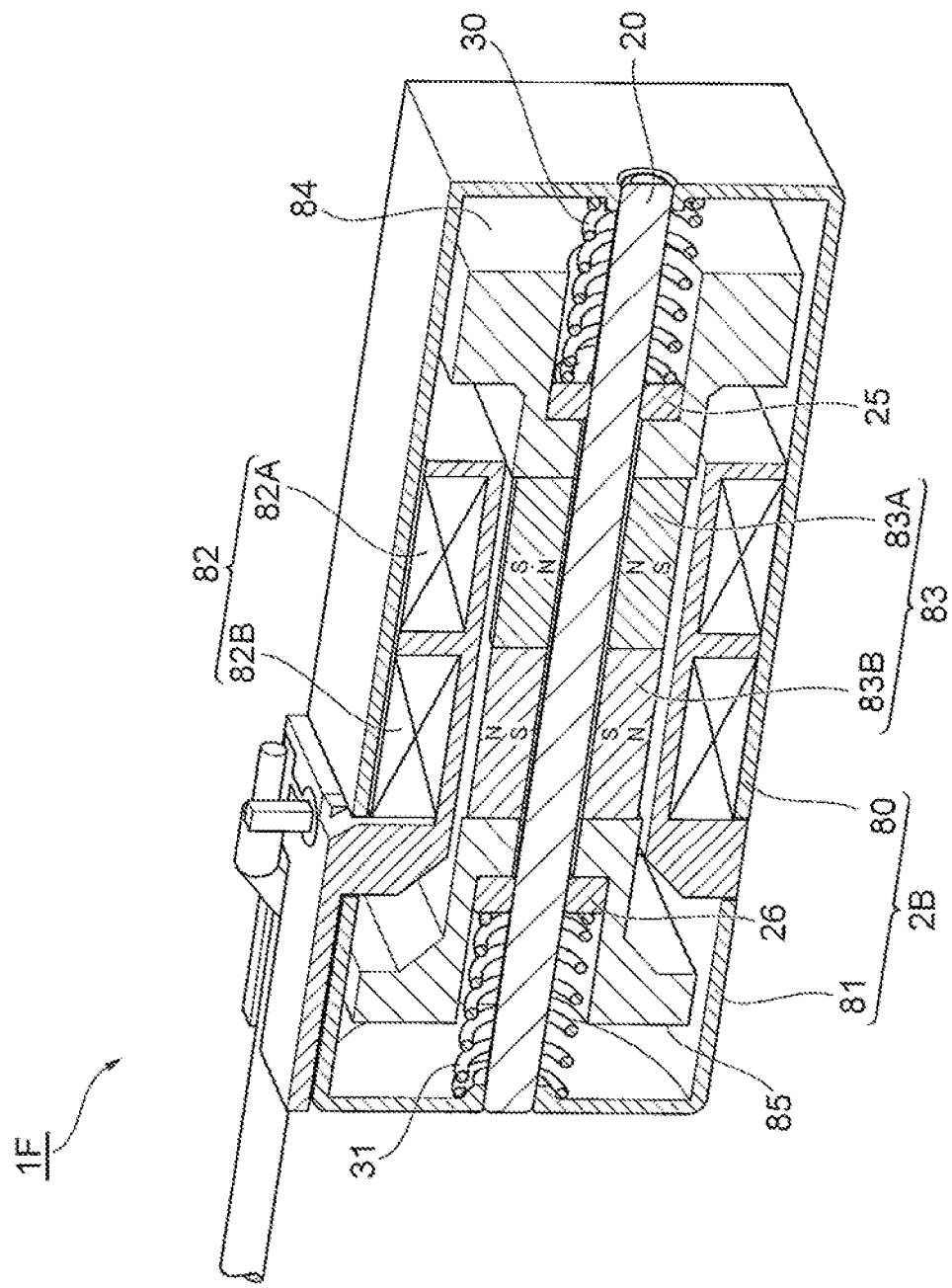
FIG. 9 is a sectional view illustrating an oscillating actuator according to a seventh embodiment of the present invention.

The above-mentioned housings 2 and 2A may have various sectional shapes, including a circular shape, a square shape, and a polygonal shape. For example, in an oscillating actuator 1F as shown in FIG. 9, a housing 2B having a square section includes first and second housings 80 and 81 each of which has a square section. The housing 2B receives a coil 82 including first and second coil portions 82A and 82B, a magnet 83 including first and second magnet portions 83A and 83B, and first and second weights 84 and 85.

INDUSTRIAL APPLICABILITY

According to an aspect of the present invention, it is possible to achieve a secure and easy single pole magnetization of a magnet in a radial direction and to easily promote the size reduction of the oscillating actuator by reducing the diameter of the housing.

REFERENCE SIGNS LIST 1, 1A to 1F . . . oscillating actuator; 2, 2A and 2B . . . housing 3; 71 and 82 . . . coil; 3A, 3B, 71A to 7D, 82A and 82B . . . coil portion; 4, 70 and 83 . . . magnet; 4A, 4B, 70A to 7D, 83A and 83B . . . magnet portion; 6, 7, 63, 64, 65, 66, 72, 76, 84 and 85 . . . weight; 8 . . . mover, 10*a* and 11*a* . . . end wall of housing; 20 . . . shaft; 25, 26 and 73 . . . bearing; 27, 28 and 74 . . . spring seating recess; 30 and 31 . . . compression coil spring (elastic member); 61 and 62 . . . leaf spring (elastic member); L: oscillation axis

The invention claimed is:

1. An oscillating actuator in which a magnet linearly oscillates along an oscillation axis of a housing having a cylindrical shape by cooperation between a coil disposed in the housing and the magnet disposed in the housing while being surrounded by the coil, the oscillating actuator comprising:
  a shaft which is disposed along the oscillation axis of the housing and has opposite ends fixed to opposite end walls of the housing in a direction of the oscillation axis, respectively;
  a mover having the magnet which is freely movable in an extending direction of the shaft, the shaft extending through the magnet; and
  one or more elastic members disposed between the mover and an end wall, the one or more elastic members urging the mover in the direction of the oscillation axis, wherein the shaft and the housing are formed of a magnetic material,
  the magnet having a cylindrical shape includes a plurality of magnet portions which are magnetized in a radial direction and are divided in the direction of the oscillation axis, and the magnet portions include adjacent magnet portions having different magnetic poles in the direction of the oscillation axis,
  the coil includes a plurality of coil portions which are divided in the direction of the oscillation axis and correspond to the magnet portions, respectively, and the coil portions include adjacent coil portions wound in opposite directions to each other,
  the mover includes a weight which is integrated with the magnet and is freely movable with the magnet, the shaft extends through the weight, the weight includes one or more weight portions disposed on one or more sides of the magnet in the extending direction of the shaft,
  the weight is supported by one or more bearings with respect to the shaft, and
  the one or more elastic members are disposed on one or more sides of the mover in the direction of the oscillation axis, and one end of the one or more elastic members is inserted in one or more spring seating recesses formed in the weight.

2. The oscillating actuator of claim 1, wherein the one or more bearings are disposed in the one or more spring seating recesses with respect to the shaft, and
  the one or more bearings and the weight are urged by the one or more elastic members inserted in the one or more spring seating recesses.

* * * * *